United States Patent
Witschnig et al.

(10) Patent No.: US 8,369,786 B2
(45) Date of Patent: Feb. 5, 2013

(54) RADIO FREQUENCY COMMUNICATION DEVICE AND METHOD FOR OPERATING THE SAME

(75) Inventors: Harald Witschnig, Linz (AT); Erich Merlin, Gratkorn (AT); Alexander Maier, St. Peter (AT)

(73) Assignee: NXP B.V., Eindhoven (NL)

( * ) Notice: Subject to any disclaimer, the term of this patent is extended or adjusted under 35 U.S.C. 154(b) by 172 days.

(21) Appl. No.: 12/989,568

(22) PCT Filed: Apr. 21, 2009

(86) PCT No.: PCT/IB2009/051630
§ 371 (c)(1),
(2), (4) Date: Oct. 25, 2010

(87) PCT Pub. No.: WO2009/136303
PCT Pub. Date: Nov. 12, 2009

(65) Prior Publication Data
US 2011/0053503 A1    Mar. 3, 2011

(30) Foreign Application Priority Data

May 5, 2008   (EP) .................................. 08103818

(51) Int. Cl.
*H04B 7/00*   (2006.01)
*H04B 1/00*   (2006.01)
(52) U.S. Cl. ........................................... 455/42; 455/61

(58) Field of Classification Search .................. 455/102, 455/107, 82, 83, 73, 61, 17, 21, 23, 42, 44, 455/45, 46, 59, 60, 203
See application file for complete search history.

(56) References Cited

FOREIGN PATENT DOCUMENTS
| | | |
|---|---|---|
| EP | 1 575 184 A1 | 9/2005 |
| EP | 1 798 867 A2 | 6/2007 |
| GB | 2 434 511 A | 7/2007 |

OTHER PUBLICATIONS

"Identification Cards—Contactless Integrated Circuit(s) Cards—Proximity Cards—Part 2: Radio Frequency Power and Signal Interface"; ISO/IEC FCD 14443-2, XX, XX, No. 14443-2; pp. 1-15; (Mar. 26, 1999).
International Search Report for Application PCT/IB2009/051630 (Apr. 21, 2009).

*Primary Examiner* — Eugene Yun

(57) ABSTRACT

A radio frequency (RF) communication device (1, 1', 10) has data transmission means and data receiving means. The data transmission means comprise load modulating means (3) being adapted to receive a radio frequency carrier signal (CS1, CS2) emitted by another RF communication device (1, 1', 10) and to modulate the RF carrier signal (CS1, CS2) by means of load modulation in accordance with data to be sent. The data receiving means comprise a RF frequency carrier signal generator (4) being adapted to emit a radio frequency carrier signal (CS1, CS2) and load demodulating means (5) being connected to an emission path (4a) of the radio frequency carrier signal and demodulating the radio frequency carrier signal (CS1, CS2) when it has been load modulated by another RF communication device (1, 1', 10).

11 Claims, 2 Drawing Sheets

RADIO FREQUENCY COMMUNICATION DEVICE AND METHOD FOR OPERATING THE SAME

FIELD OF THE INVENTION

The invention relates to a radio frequency (RF) communication device having data transmission means and data receiving means.

The invention further relates to a method of communication among radio frequency (RF) communication devices each comprising a data transmission mode and a data receiving mode.

BACKGROUND OF THE INVENTION

Near Field Communication or NFC, is a short-range high frequency wireless communication technology which enables the exchange of data between devices over about a decimetre distance. The technology is an extension of the ISO 14443 proximity-card standard (contactless card, RFID) that combines the interface of a smartcard and a reader into a single device. NFC is an open platform technology standardized in ECMA-340 and ISO 18092. An NFC device can communicate with both existing ISO 14443 smartcards and readers, as well as with other NFC devices, and is thereby compatible with existing contactless infrastructure already in use for e.g. public transportation and payment. Presently, NFC is primarily aimed at usage in mobile phones.

NFC devices communicate with each other via magnetic field induction, where each of the NFC device comprises a loop antenna. The two antennas are located within each other's near field, effectively forming an air-core transformer. NFC devices operate within a frequency band of 13.56 MHz, with a bandwidth of almost 2 MHz.

There are two operating modes provided:

Passive Communication Mode: In this mode an NFC connection is built from an "initiator" to a "target". The initiator thereby acts as an active device, constantly emitting an electromagnetic carrier signal field. The target is inactive (from an energetic point of view), i.e. it does not emit a radio field. The initiator transmits data to the target by modulating its carrier signal during a data transmission (e.g. by on/off keying). Data transmission from the target to the initiator occurs in that the target modulates the existing electromagnetic carrier signal field by means of load modulation. Load modulation means that the target changes the resistance of a circuit which comprises a receiving coil that receives the carrier signal. This change of electric resistance can be accomplished by adding and removing resistors or by short-circuiting of the receiving coil and causes a detectable voltage drop in a transmitting coil of the initiator, since receiving coil and transmitting coil act as primary and secondary coils of a transformer coupled via an air-core. By means of sequences of changing the electrical resistance data are serially transmitted from the target to the initiator. In this mode, the target device may draw its operating power from the initiator-provided electromagnetic field, thus making the target device a transponder.

Active Communication Mode: Both initiator and target device communicate by alternately generating their own modulated electromagnetic fields. A device deactivates its RF field while it is waiting for data. In this mode, both devices typically need to have a power supply. In this active communication mode the prevailing modulation processes are Manchester coding and Modified Miller coding.

While NFC has proved to be a reliable data transmission system it suffers from the drawback that the achievable data transmission rates are limited (typically data transmission rates of less than 500 kBd are achieved).

The problem of insufficient data transmission rates generally applies to Radio Frequency Identification (RFID) systems and hinders the implementation of highly-developed RFID applications. An example of such an application is an electronic passport where photographs, fingerprints and other biometric data are stored in an RF transponder and have to be transferred to a reader within the shortest time possible in order to avoid long queues at immigration lines or the like.

While date transmission rates could be raised by enlarging the bandwidth this simple approach is not feasible since the available bandwidths are strictly regulated by international standards and there are no free frequency bands. Hitherto, the only way to steer out of this dead end seemed to make use of higher order modulation schemes which suffer from the drawback that their implementation is rather complex and requires high technical efforts.

OBJECT AND SUMMARY OF THE INVENTION

It is an object of the invention to provide a radio frequency communication device of the type defined in the opening paragraph and a communication method of the type defined in the second paragraph, in which the disadvantages defined above are avoided.

In order to achieve the objects defined above, a radio frequency communication device according to the invention comprises the following characteristic features:

A radio frequency (RF) communication device having data transmission means and data receiving means, wherein the data transmission means comprise load modulating means being adapted to receive a radio frequency carrier signal emitted by another RF communication device and to modulate the RF carrier signal by means of load modulation in accordance with data to be sent, and wherein the data receiving means comprise a RF frequency carrier signal generator being adapted to emit a radio frequency carrier signal and load demodulating means being connected to an emission path of the radio frequency carrier signal and demodulating the radio frequency carrier signal when it has been load modulated by another RF communication device.

In order to achieve the object defined above, a radio frequency communication method according to the invention comprises the following characteristic features:

A method of communication among radio frequency (RF) communication devices each comprising a data transmission mode and a data receiving mode, wherein in the data transmission mode a radio frequency carrier signal emitted by another RF communication device is received and load modulated in accordance with data to be sent, and wherein in the data receiving mode a RF frequency carrier signal is generated, emitted and load demodulated as this RF frequency carrier signal has been load modulated by another RF communication device.

According to the present invention data transmission is carried out bi-directionally in a load modulation mode, i.e., not only from the target to the initiator, but also from the initiator to the target. For this purpose, the active role, i.e., the active emission of an electromagnetic field, is repeatedly changed during a communication session between the RF communication devices in such a way that the communication device acting as a data receiver emits an unmodulated carrier signal, and the communication device acting as a data transmitter carries out load-modulation on said carrier signal. From an energetic point of view, this situation is just reversed.

The data receiving communication device is an energy supplier, whereas the data transmitting communication device is an energy sink.

The characteristic features according to the invention provide the advantage that circuits for data decoding within the communication device are less complex than prior art circuits and can therefore be designed with less chip area and less power consumption than prior art implementation.

Further, according to prior art, for high data transmission rates each NFC device requires one modulator and one demodulator each for phase-modulated (initiator is transmitting) and for load-modulated (target is transmitting) signals. However, according to the present invention, not more than one modulator and one demodulator are required for load-modulated signals, whereby the circuitry expenditure decreases significantly.

In known RF communication devices if the target is moved too closely to the initiator, it may happen that the circuit is overheated or even destroyed because of the increased amount of energy supplied. For this reason, the transmitting power has to be adapted to the actual distance between the devices, which means that depending on the distance it has to be decreased. If information is coded in different amplitude levels, such limiting of the transmitting power will involve a loss of information. Since such different amplitude levels also appear in a phase modulation, said effect occurs there as well. However, since no electromagnetic field is emitted during a load modulation, there is also no need to limit it. Thus, according to the invention, the above-mentioned loss of information will not occur.

Designing an RF communication device according to the invention such that the data transmission means and the data receiving means are coupled to separate antennas enables to operate the RF communication device with highest data transmission rate.

Alternatively, by coupling the data transmission means and the data receiving means to a common antenna production costs and size of the RF communication device can be reduced. In such an embodiment it is preferred that alternating coupling the data transmission means and the data receiving means to the common antenna is accomplished by means of a switch, e.g. an electronic switch that has short switching periods.

Usually, when a communication session between the RF communication device and another RF communication device is established some initialization routines are processed. Since theses initialization routines are time consuming it is preferred that once the communication session has been successfully established both data transmission and data receiving is accomplished during this communication session. Energy can be saved by alternatingly activating the data transmission means and the data receiving means during said communication session.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to these exemplary embodiments.

DESCRIPTION OF EMBODIMENTS

Figure 1:
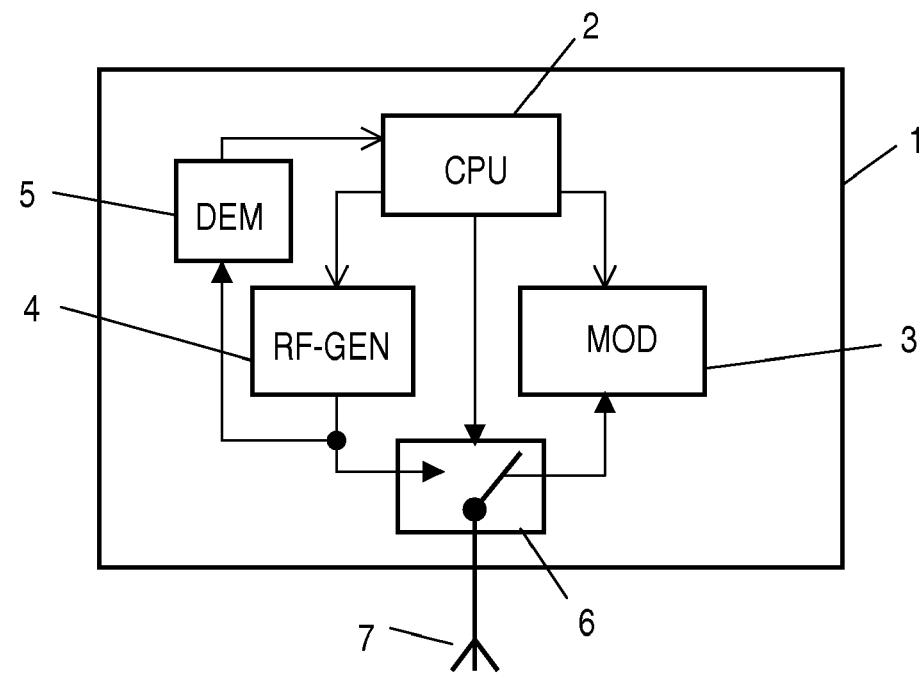
FIG. 1 shows a schematic block circuit diagram of a first embodiment of an RF communication system according to the present invention.
Figure 1:
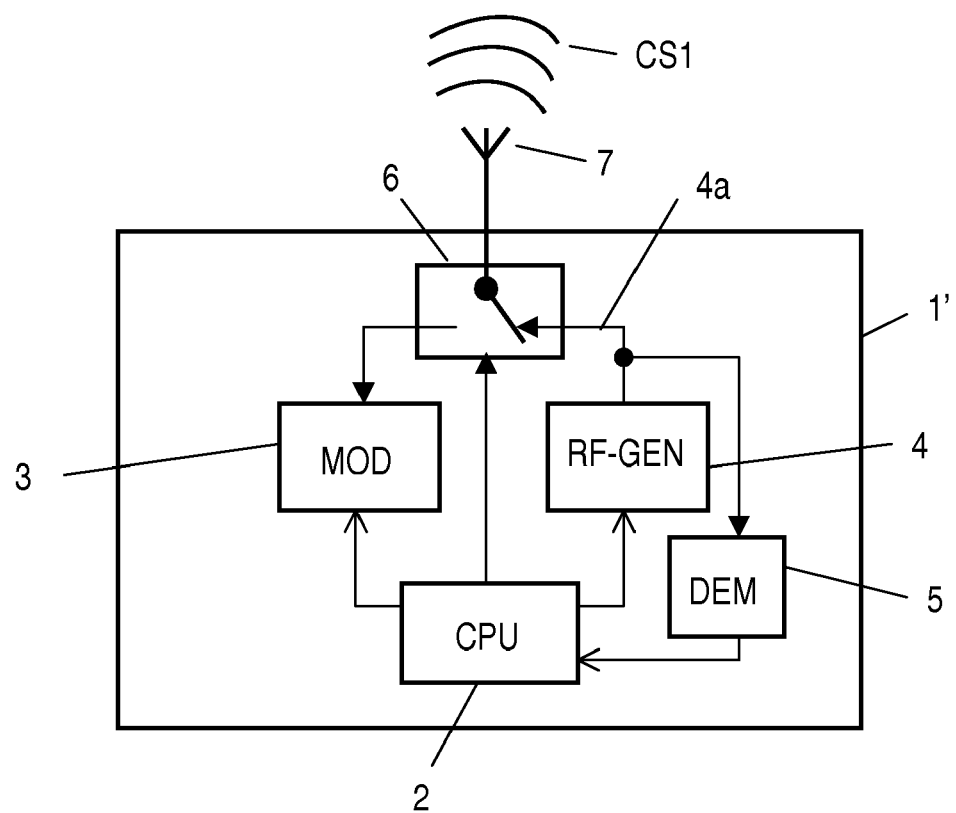

FIG. 1 shows a schematic block circuit diagram of a first embodiment of an RF communication system according to the present invention. This RF communication system comprises two identical radio frequency (RF) communication devices 1, 1' which are configured as Near Field Communication (NFC) devices. The RF communication devices 1, 1' have data transmission means that comprise a load modulator 3. The RF communication devices 1, 1' further have data receiving means that comprise a radio frequency carrier signal generator 4 (e.g. being adapted to generate a 13,56 MHz sinus signal) and a load demodulator 5. Switching means 6, such as an electronic switching circuit, are provided for coupling either the RF carrier signal generator 4 and the load demodulator 5 or the load modulator 3 to an antenna 7 that is e.g. configured as a loop antenna. It should be noted that the switching means 6 are understood as logical and/or physical switching means. A central processing unit 2 is provided which is configured to control the modulator 3, the RF carrier signal generator 4 and the switching means 6. In the present state of the RF communication system the lower communication device 1' is operating in a data receiving mode in which the RF carrier signal generator 4 is coupled to the antenna 7 so that the RF carrier signal CS1 is emitted as an electromagnetic field signal.

The upper RF communication device 1 is operating in a data transmitting mode in which the load modulator 3 is coupled to the antenna 7. The antenna 7 receives the RF carrier signal CS1 and feeds it to the input of the load modulator 3. The load modulator 3 varies the received RF carrier signal CS1 by periodically adding and removing resistors to and from the circuit. Since the two antennas 7 of the two RF communication devices act as the primary and secondary coils of a transformer with an air-core varying the RF carrier signal CS1 by the load modulator 3 of the upper RF communication device results in a change of the impedance of this transformer with air-core, or, in other words, in a voltage drop at the output of the RF carrier signal generator 4 of the lower RF communication device 1', which voltage drop is detectable by the load demodulator 5 which is connected in an emission path 4a between the output of the RF carrier signal generator 4 and the antenna 7. Thereby, the data transmitted by the upper RF communication device 1 via load modulation are derived from the load modulated RF carrier signal CS1 by the load demodulator 5 of the lower RF communication device 1' and are forwarded to the central processing unit 2 for further processing.

As will be appreciated the data transmission means, namely the load modulator 3, and the data receiving means, namely the RF carrier signal generator 4 and the load demodulator 5, of the RF communication devices 1, 1' share a common antenna 7. However, the central processing unit 2 controls the switching means 6 such that the data transmission means and the data receiving means are alternatingly coupled to a common antenna.

Since the RF communication devices 1, 1' are configured as NFC devices they are adapted to provide both reader and card functionality and can act as reader and card. Further, both devices can act as initiator and target. In actual implementations and setups the reader is configured as initiator. In the exemplary embodiment of FIG. 1 the lower RF communication device 1' is configured as a reader which generates the RF carrier signal CS1 that provides electric supply energy for the RF communication device 1 which is configured as card. It should be noted that data communication is started by the card, i.e. the upper RF communication device 1, by means of load modulation as has been explained above. When the upper RF communication device 1 has sent all data the state of the switching means 6 is changed such that the load modulator 3 is decoupled from the antenna 7 and the RF carrier signal generator 4 and the load demodulator 5 are coupled to the antenna 7. In the lower RF communication device 1' the switching means 7 are switched vice versa. Thereby, the upper RF communication device 1 emits an RF carrier signal and the lower RF communication device 1' answers by modulating the RF carrier signal. When the answer is complete the state of the switching means 6 of both RF communication devices 1, 1' is changed again to exchange further data. During a communication session changing of the state of the switching means 6 may occur as often as necessary to complete the data exchange.

The main advantage of this concept is that data transfer between the two RF communication devices is always carried out by load modulation, which significantly reduces the limitations of data transmission rates.

Figure 2:
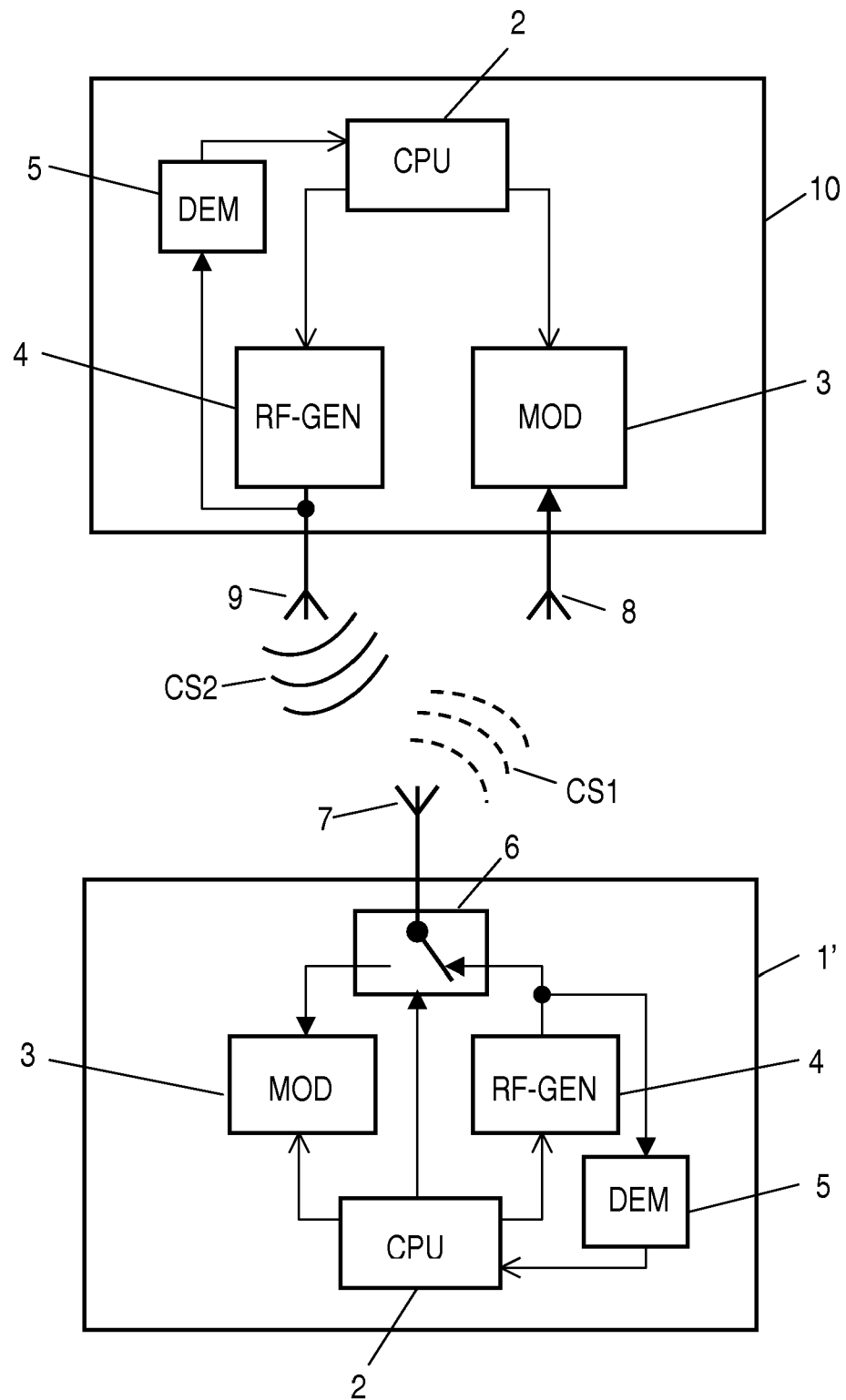
FIG. 2 shows a schematic block circuit diagram of a second embodiment of an RF communication system according to the present invention.

FIG. 2 shows a schematic block circuit diagram of a second embodiment of an RF communication system that differs from the first embodiment in that the upper RF communication device 1 has been replaced by an RF communication device 10 that has separate antennas 8, 9. Antenna 8 is coupled to a load modulator 3 and antenna 9 is coupled to an RF carrier signal generator 4 and a load demodulator 5. Since by this configuration the receiving path and the transmitting path are separated from each other switching means could be omitted. Like in the first embodiment a central processing unit 2 controls the RF carrier signal generator 4 to emit an RF carrier signal CS2 via the antenna 9 when the RF communication device 10 is operated in a data receiving mode, and to modulate an RF carrier signal CS1 received via the antenna 8 by means of the load modulator 3 when the RF communication device 10 is operated in a data transmitting mode. The RF carrier signal CS1 is emitted by a lower RF communication device 1' which is the same as in the first embodiment of the invention.

When the two RF carrier signals CS1, CS2 have different frequencies so that they do not interfere with each other the RF carrier signal generator 4 of the upper RF communication device 10 need not be turned off when switching said device 10 from a data receiving mode to a data transmitting mode. Rather it may always be turned on so that it can act as an energy supply for the lower RF communication device 1'. Further, the functionalities need not be switched.

It should be noted that the terms "upper" and "lower" RF communication device merely designates the position of the respective devices in the drawing, but has no technical meaning. Further, the present invention is not limited to two RF communication devices.

It should be further noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A radio frequency communication device having data transmission means and data receiving means, wherein the data transmission means comprise load modulating means being adapted to receive a radio frequency carrier signal emitted by another RF communication device and to modulate the RF carrier signal by means of load modulation in accordance with data to be sent, and wherein the data receiving means comprise a RF frequency carrier signal generator being adapted to emit a radio frequency carrier signal and load demodulating means being connected to an emission path of the radio frequency carrier signal and demodulating the radio frequency carrier signal when it has been load modulated by another RF communication device.

2. The RF communication device as claimed in claim 1, wherein the data transmission means and the data receiving means are coupled to separate antennas.

3. The RF communication device as claimed in claim 1, wherein the data transmission means and the data receiving means are alternately coupled to a common antenna.

4. The RF communication device as claimed in claim 3, comprising switching means for alternately coupling the data transmission means and the data receiving means to the common antenna.

5. The RF communication device as claimed in claim 1, being designed to establish a communication session with another RF communication device and to send data to and receive data from the other RF communication device.

6. The RF communication device as claimed in claim 5, being adapted to alternately activate the data transmission means and the data receiving means during the communication session.

7. A method of communication among radio frequency (RF) communication devices each comprising a data transmission mode and a data receiving mode, wherein in the data transmission mode a radio frequency carrier signal emitted by another RF communication device is received and load modulated in accordance with data to be sent, and wherein in the data receiving mode a RF frequency carrier signal is generated, emitted and load demodulated as this RF frequency carrier signal has been load modulated by another RF communication device.

8. The communication method as claimed in claim 7, wherein the RF communication device comprises separate antennas for receiving an RF carrier signal and for emitting an RF carrier signal, respectively.

9. The communication method as claimed in claim 7, wherein receiving the RF carrier signal in the data transmission mode and emitting the RF carrier signal in the data receiving mode is alternately accomplished via the same antenna of the RF communication device.

10. The communication method as claimed in claim 7, wherein a communication session with another RF communication device is established for both sending data to and receiving data from the other RF communication device.

11. The communication method as claimed in claim 10, wherein during the communication session sending data and receiving data is alternately carried out.

* * * * *